UNITED STATES PATENT OFFICE.

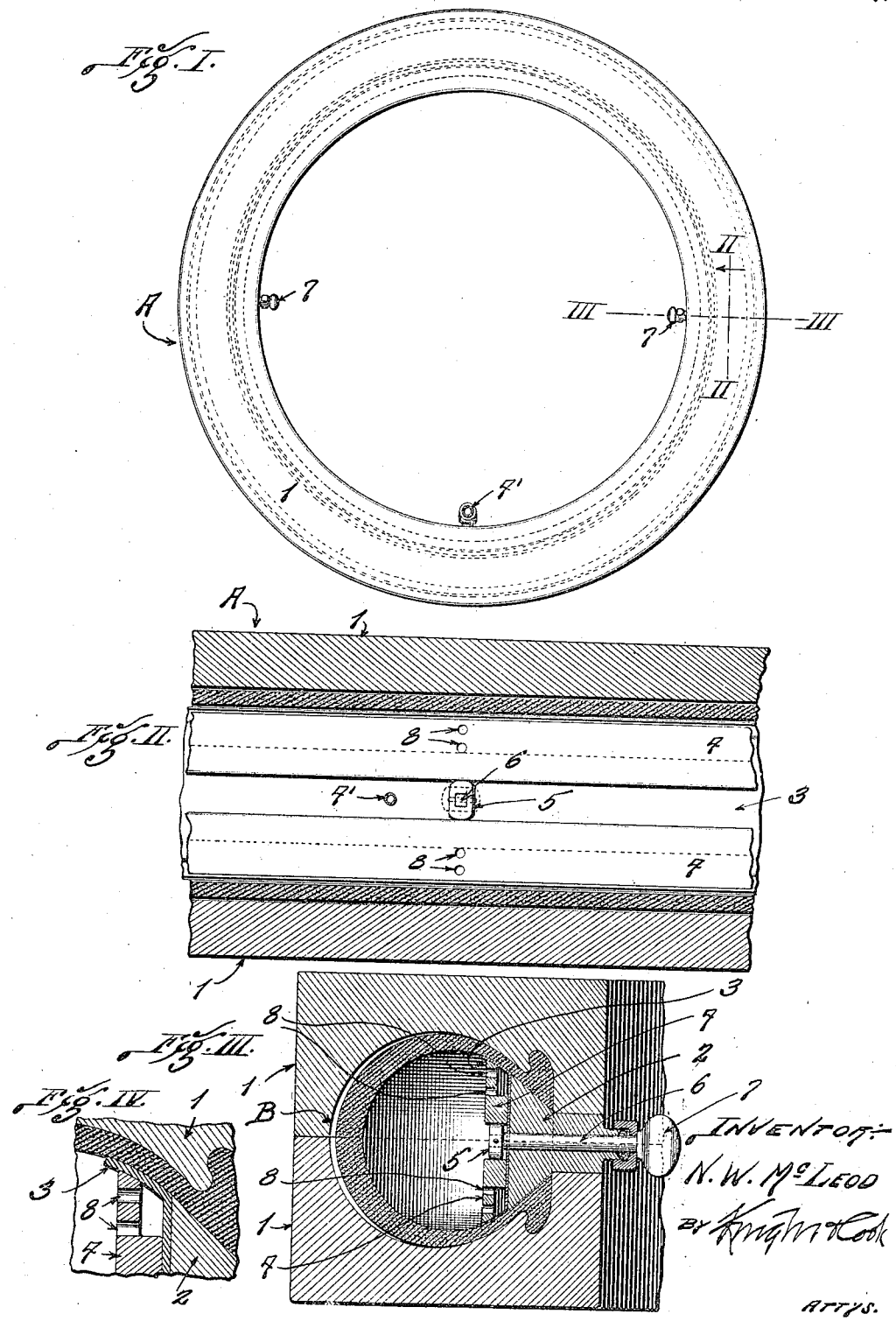

NELSON W. McLEOD, OF ST. LOUIS, MISSOURI, ASSIGNOR TO AMERICAN MOTORS TIRE COMPANY, OF DETROIT, MICHIGAN, A CORPORATION OF MICHIGAN.

MOLD FOR MAKING PNEUMATIC TIRES.

1,215,828.  Specification of Letters Patent.  Patented Feb. 13, 1917.

Application filed May 4, 1916. Serial No. 95,339.

*To all whom it may concern:*

Be it known that I, NELSON W. MCLEOD, a citizen of the United States of America, a resident of the city of St. Louis, State of Missouri, have invented certain new and useful Improvements in Molds for Making Pneumatic Tires, of which the following is a full, clear, and exact description, reference being had to the accompanying drawings, forming a part of this specification.

My invention relates to a mold for holding pneumatic tires or casings during vulcanization of the rubber therein. The mold to which my present invention relates is of the kind designed to receive internal fluid pressure which acts against the tire while it is in the mold for the purpose of forcing the tire outwardly against the wall of the mold cavity and holding it thereat during vulcanization.

Molds of the description here referred to comprise separable shell sections which, when assembled, afford an annular molding cavity for the bodies of tires and a necessary adjunct of a mold of this character is an abutment ring which is located between the separable edges of the pneumatic tire structure and between which and the shell sections said separable edges are clamped when the mold is closed.

It has been found difficult, in some instances, particularly where there are metal elements in the separable edges of the tire, to prevent leakage and permeation of the fluid introduced into the tires to expand them if reliance is placed upon merely the clamping of the separable edges of the tire between the abutment ring and the shell sections of the mold. The object of this invention is to provide a simple and efficient means by which the pressure medium utilized to expand the tire structures in the molds is barred from access to the separable edge portions of the tires, thereby eliminating all liability of the permeation of fluid pressure medium into and through such edge portions.

Figure I is a side elevation of my mold.

Fig. II is an enlarged section taken through the mold on line II—II, Fig. I, looking in the direction of the arrows crossing said line.

Fig. III is an enlarged cross section taken on line III—III, Fig. I.

Fig. IV is an enlarged cross section of a part of the mold, illustrating more clearly one of the side portions of the barrier and one of the binding members pressing thereagainst.

In the accompanying drawings, A designates my mold as a whole, the said mold comprising two shell sections 1—1 and an abutment ring 2 which is located between the shell sections near the inner circle of the mold. The abutment ring 2 is a member separate and independent of the shell sections 1 and it is adapted to be located at least in part in the mold cavity B where it occupies a position between the separable edges or bead edges of the pneumatic tire to be molded, in order that said edges may be clamped and held between the abutment ring and the adjacent portions of the mold shell sections.

The tire structure, composed of fabric and rubber compound in an uncured state, is introduced into the mold and its edges are confined between the mold shell sections and the abutment ring, as seen in Fig. III. The mold is then held closed in any suitable manner and fluid under pressure, preferably water, is introduced into the confined tire through the abutment ring, a suitable conducting pipe 4' being attached to the abutment ring 2 for the introduction of the fluid. The fluid under pressure delivered into the uncured tire acts to expand the tire structure and hold it firmly to the wall of the mold cavity B prior to the application of heat to the mold and the fluid pressure is continued until the rubber compound has been kept in a heated condition a sufficient length of time to vulcanize the rubber compound.

It is highly important that there be no loss of the fluid pressure medium from the interior of the tire being formed and vulcanized by permeation of the fluid through the separable edge portions of the tire which are clamped between the abutment ring and the mold sections, and to avoid such loss I use a barrier device through the medium of which the fluid delivered into the hollow tire structure in the mold is excluded from access to the edge portions of the tire.

3 designates a pliable barrier, strip or ring, preferably of rubberized fabric, which is adapted to lie in contact with the inner wall of the tire structure at points between those touched by the abutment ring 2 and the periphery of the tire structure. In the drawings I have shown this barrier strip resting upon and encircling the abutment ring and extending thereacross, the barrier strip being of sufficient width to extend from the edges of the abutment ring to a considerable distance along the inner walls of the tire structure. The barrier strip may be cemented or otherwise secured to the abutment ring or it may merely lie thereagainst. The side portions of the barrier strip are, in the construction illustrated, held firmly against the inner walls of the tire structure by binding rings 4 which are situated exteriorly of, and movable transversely relative to, the abutment ring. These binding rings may be adjusted outwardly by any suitable means to force them into contact with the side portions of the barrier strip. The means I have shown for so adjusting the binding rings comprises cams 5 positioned between the rings and carried by operating stems 6 which extend through the abutment ring 2 and have handles 7 by which the stems and cams may be turned to shift the binding rings laterally.

The binding rings are preferably reduced in thickness throughout their outer portions and contain apertures 8 through which the confined fluid in the tire may pass to press against the barrier strip 3 back of the binding rings in order that said barrier strip may be forced, by fluid pressure, against the wall of the tire structure and the abutment ring 2 at the point of contact between abutment ring and the tire.

While I have shown the barrier strip 3 of sufficient width to extend across the abutment ring and onto the inner wall portions of a confined tire at each side of the abutment ring it is obvious that the same result may be obtained by using two barrier strips.

I claim:—

1. In a mold for rubber objects having separable edges, a shell within which the object to be molded may be confined, an annular device between which and said shell the separable edges of the object to be molded may be held, means for introducing fluid into the confined object, a barrier within said object adapted to extend from said annular device to the wall of the confined object, and means for holding said barrier against the wall of said object.

2. In a mold for pneumatic tires having separable edges, a shell within which the tire structure to be molded may be confined, an annular device between which and said shell the separable edges of the tire structure may be held, means for introducing fluid into a tire structure confined in said mold, a flexible barrier associated with said annular device and extending therefrom to the inner wall of the confined tire structure, and means for holding said barrier against the wall of said tire structure.

3. In a mold for pneumatic tires having separable edges, a shell within which the tire structure to be molded may be confined, an annular device between which and said shell the separable edges of the tire structure may be held, means for introducing fluid into a tire structure confined in said mold, a flexible barrier associated with said annular device and extending therefrom to the inner wall of the confined tire structure, and means shiftable laterally relative to said annular device for holding said barrier against the wall of said tire structure.

4. In a mold for pneumatic tires having separable edges, a shell within which the tire structure to be molded may be confined, an annular device between which and said shell the separable edges of the tire structure may be held, means for introducing fluid into a tire structure confined in said mold, a flexible barrier associated with said annular device and extending therefrom to the inner wall of the confined tire structure, and a binding ring for holding said barrier against the wall of said tire structure.

5. In a mold for pneumatic tires having separable edges, a shell within which the tire structure to be molded may be confined, an annular device between which and said shell the separable edges of the tire structure may be held, means for introducing fluid into a tire structure confined in said mold, a flexible barrier associated with said annular device and extending therefrom to the inner wall of the confined tire structure, a binding ring encircling said annular device, and means for shifting said binding ring laterally to force said barrier into contact with the wall of the tire structure.

6. In a mold for pneumatic tires having separable edges, a shell within which the tire structure to be molded may be confined, an annular device between which and said shell the separable edges of the tire structure may be held, means for introducing fluid into a tire structure confined in said mold, a flexible barrier associated with said annular device and extending therefrom to the inner wall of the confined tire structure, a pair of binding rings encircling said annular device, and means for moving said binding rings laterally in opposite directions to force said barrier into contact with the wall of said tire structure.

7. In a mold for pneumatic tires having separable edges, a shell within which the tire structure to be molded may be confined, an annular device between which and said shell, the separable edges of the tire structure may be held, means for introducing fluid into a tire structure confined in said mold, a flexible barrier associated with said annular device and extending therefrom to the inner wall of the confined tire structure, and means shiftable laterally relative to said annular device for holding said barrier against the wall of said tire structure, said last named means having openings therein permitting passage of fluid therethrough for the purpose set forth.

NELSON W. McLEOD.